United States Patent
Perni et al.

(10) Patent No.: US 11,295,546 B2
(45) Date of Patent: Apr. 5, 2022

(54) METHOD OF TRACKING A PLURALITY OF OBJECTS

(71) Applicants: WREN THERAPEUTICS LIMITED, Cambridge (GB); CAMBRIDGE ENTERPRISE LIMITED, Cambridge (GB)

(72) Inventors: Michele Perni, Cambridge (GB); Quentin Alexis Eric Peter, Cambridge (GB); Pavan Kumar Challa, Cambridge (GB); Tadas Kartanas, Cambridge (GB); Pietro Sormanni, Cambridge (GB); Julius Bier Kirkegaard, Cambridge (GB); Michele Vendruscolo, Cambridge (GB); Christopher Martin Dobson, Cambridge (GB); Tuomas Pertti Jonathan Knowles, Cambridge (GB)

(73) Assignees: Cambridge Enterprise Limited, Cambridge (GB); Wren Therapeutics Limited, Cambridge (GB)

( * ) Notice: Subject to any disclaimer, the term of this patent is extended or adjusted under 35 U.S.C. 154(b) by 0 days.

(21) Appl. No.: 16/978,656

(22) PCT Filed: Mar. 7, 2019

(86) PCT No.: PCT/GB2019/050644
§ 371 (c)(1),
(2) Date: Sep. 4, 2020

(87) PCT Pub. No.: WO2019/171068
PCT Pub. Date: Sep. 12, 2019

(65) Prior Publication Data
US 2021/0004564 A1  Jan. 7, 2021

(30) Foreign Application Priority Data
Mar. 8, 2018  (GB) ...................... 1803724

(51) Int. Cl.
*G06K 9/00*  (2022.01)
*G06K 9/20*  (2006.01)
(Continued)

(52) U.S. Cl.
CPC .......... *G06V 20/693* (2022.01); *G06V 10/147* (2022.01); *G06V 10/435* (2022.01); *G06V 20/695* (2022.01)

(58) Field of Classification Search
CPC ............... G06K 9/209; G06K 7/10732; G06K 9/00335; G06K 9/00664; G06K 9/0061;
(Continued)

(56) References Cited

U.S. PATENT DOCUMENTS

2004/0076999 A1 * 4/2004 Faeldt ................... G06T 7/0012
435/6.18
2005/0207633 A1 * 9/2005 Arini .................. G01N 21/6458
382/133

(Continued)

OTHER PUBLICATIONS

Implementation and Evaluation of Vision-Based Sensor Image Compression for Close-Range Photogrammetry and Structural Health Monitoring (Year: 2020).*

(Continued)

*Primary Examiner* — Nizar N Sivji
(74) *Attorney, Agent, or Firm* — Alston & Bird LLP (57) ABSTRACT

Method of tracking a plurality of objects comprising: focusing an image of the objects on an imaging element using an optical system; capturing the image of the objects using an imaging element comprising a plurality of pixels; measuring at least one characteristic of the objects from the captured image using an image processor; wherein the field of view is set be the widest field of view for which the image processor is able to measure the at least one characteristic.

18 Claims, 6 Drawing Sheets

(51) Int. Cl.
 *G06K 9/52* (2006.01)
 *G06V 20/69* (2022.01)
 *G06V 10/147* (2022.01)
 *G06V 10/42* (2022.01)

(58) Field of Classification Search
 CPC ............. G06K 9/00805; G06K 9/6267; G06K 9/00127; G06K 2009/00939; G06K 9/00617; G06K 9/00134; G06K 9/0014; G06K 9/525
 See application file for complete search history.

(56) References Cited

U.S. PATENT DOCUMENTS

| | | | | |
|---|---|---|---|---|
| 2014/0152794 | A1* | 6/2014 | Takahashi | G01B 9/04 348/79 |
| 2014/0286529 | A1* | 9/2014 | Sprenger | G06K 9/00127 382/103 |

OTHER PUBLICATIONS

International Search Report and Written Opinion for PCT/GB2019/050644 (ISA/EP) dated Aug. 19, 2019 (17 pages).
Perni et al. *A novel tool for live automated quantitative analysis of protein inclusions*, Dept of Chemistry, University of Cambridge (19 pages).
Aprile et al., *Selective targeting of primary and secondary nucleation pathways in Aβ42 aggregation using a rational antibody scanning method*, Sci Adv 3 (6), e1700488 [retrieved from internet Jan. 6, 2021] (12 pages).
Habchi et al., *An anticancer drug suppresses the primary nucleation reaction that initiates the production of the toxic Aβ42 aggregates linked with Alzheimer's disease*, Neuroscience, Sci. Adv. 2016; 2:e1501244, Feb. 12, 2016 (13 pages).
Habchi et al., *Systematic development of small molecules to inhibit specific microscopic steps of Aβ42 aggregation in Alzheimer's disease*, Dept. of Chemistry, University of Cambridge, PNAS Published online Dec. 23, 2016 (9 pages).
Kaminski et al., *In Situ Measurements of the Formation and Morphology of Intracellular β-Amyloid Fibrils by Super-Resolution Fluorescence Imaging*, Journal of the American Chemical Society 2011, 133, pp. 12902-12905, downloaded via Univ of Cambridge on Dec. 11, 2020.
Link et al., *Expression of human β-amyloid peptide in transgenic Caenorhabditis elegans*, Dept of Biological Sciences, University of Denver, Proc. Natl. Acad. Sci. USA vol. 92, pp. 9368-9372, Sep. 1995 Neurobiology.
Marcellino et al., *WormAssay: A Novel Computer Application for Whole-Plate Motion-based Screening of Macroscopic Parasites*, PLoS Negl Trop Dis 6(1): e1494. Doi:10.1371/journal.pntd.0001494, Published Jan. 31, 2012
McColl et al., *Utility of an improved model of amyloid-beta (Aβ1-42) toxicity in Caenorhabditis elegans for drug screening for Alzheimer's disease*, Molecular Neurodegeneration 2012 7:57.
Morley et al., *The threshold for polyglutamine-expansion protein aggregation and cellular toxicity is dynamic and influenced by aging in Caenorhabditis elegans*, PNAS, Aug. 6, 2002, vol. 99, No. 16, pp. 10417-10422.
Perni et al., *A natural product inhibits the initiation of α-synuclein aggregation and suppresses its toxicity*, PNAS 114 Published online Jan. 17, 2017 (10 pages).
Perni et al., *Massively parallel C. elegans tracking provides multi-dimensional fingerprints for phenotypic discovery*, Elsevier, Journal of Neuroscience Methods 306 (2018) pp. 57-67.
Perni et al., *Delivery of Native Proteins into C. elegans Using a Transduction Protocol Based on Lipid Vesicles*, Scientific Reports Published online Nov. 8, 2017 (8 pages).
Perni et al., *A drug from sharks to treat Parkinson's disease*, Article file (14 pages).
Ramot et al., *The Parallel Worm Tracker: A Platform for Measuring Average Speed and Drug-Induced Paralysis in Nematodes*, PLoS One May 2008, vol. 3, Issue 5, e2208 (7 pages).
Van Ham et al., *C. elegans Model Identified Genetic Modifiers of α-Synuclein Inclusion Formation During Aging*, PLoS Genet 4(3): e1000027. doi:10.1371/journal.pgen.1000027, Published Mar. 21, 2008 (11 pages).
Husson et al., *Keeping track of worm trackers*, [retrieved from internet on Jan. 12, 2021] http://www.wormbook.org/chapters/www_tracking/tracking.html, (17 pages).

* cited by examiner

METHOD OF TRACKING A PLURALITY OF OBJECTS

CROSS-REFERENCE TO RELATED APPLICATIONS

This application is a national stage entry of PCT/GB2019/050644 filed Mar. 7, 2019, which claims the benefit of GB Patent Application No. 1803724.2 filed, Mar. 8, 2018.

The present disclosure relates to methods of tracking multiple objects (for example, but not limited to, nematode worms), methods of preparing a sample of nematode worms, methods for identifying protein aggregate inclusions in a biological sample (for example, but not limited to, nematode worms), and methods of measuring anti-aggregation drug efficacy in a sample of nematode worms.

The nematode worm *Caenorhabditis elegans* is a model organism that is widely used for studies of genetics and of human disease. The health and fitness of the worms can be quantified in different ways, such as by measuring their bending frequency, speed or lifespan. Manual assays are time consuming and limited in their scope providing a strong motivation for automation.

These tiny worms are 1 mm in length, transparent and easy to work with; they need 3 days to develop from egg to adult at 20° C., and have life-span between 2 and 3 weeks; these characteristics facilitate the rapid study of multiple aspects of their behaviour and biology and they make them suitable for high-throughput screening studies. Despite their apparent simplicity, they have a complex neuronal network of 302 neurons, a high cellular complexity, and a tissue-specific protein expression profile comparable to that of much more evolved model organisms, such as rodents. As a result, *C. elegans* has been widely used as a model system for modelling neurodegenerative diseases and protein aggregation. It was a key a molecular tool for the identification of age-related genes, for the definition and characterization of promoters and inhibitors of protein aggregation, and for studying the effects of small molecules on such processes.

Other laboratory systems allow high-sensitivity measurements and accurate tracking for single worms. Recent developments have improved the reproducibility and sensitivity in the studies of *C. elegans* relative to conventional manual procedures. There are, however, further aspects for fully automating the behavioural screenings of *C. elegans*, that have not been solved yet, such as the development of new approaches for the simultaneous analysis of the behavioural parameters of an entire population of thousands of worms, or connecting in a robust way lifespan and behavioural assays. A number of technical difficulties are still to be overcome; these include for example the background clutter of existing worm tracks, and the crossover events between worms. It is also key to be mange to track a large number of worms that bend at high speed (up to 2-3 bends/second for young animals). Moreover, as a result of the intrinsic heterogeneity of worm behaviour, drug treatment are often very challenging and require a very large cohort of animals to be screened in order to acquire robust and reliable datasets. Furthermore, recent studies have shown how a statistical power or power of detection (POD), is key and required to detect with statistical confidence any significant change in behaviour and to limit false positive or negative results.

Protein aggregation is a common feature in a variety of incurable neurodegenerative diseases, including Alzheimer's disease (AD), Parkinson's disease (PD) and Huntington disease (HT). However, quantitative methods for the in situ characterisation of the inclusions that are formed from protein aggregates in nematode worms at a single inclusion-level, have been elusive so far.

A key advantage of using nematode worms as models for studying neurodegeneration consists in their transparency, which allows the aggregation process of disease-related proteins to be followed inside the living worms by the fusion of the protein of interest with fluorescent dyes, such as the Yellow fluorescence protein (YFP). This has also been made possible by developments in microscopy techniques, such as Fluorescence Lifetime Imaging (FLIM) (Kaminski G S et al 2011) and Fluorescence Recovery After Photo bleaching (FRAP) (Morley et al., 2002; Van Ham et al., 2008.

Although the fusion of the aggregation-prone peptides or proteins of interest to fluorescent partners is very useful in many cases, this application is not always possible due in some cases to the small size of the protein of interest. For instance, worm models of AD, where the amyloid-β peptide aggregates and leads to age-dependent paralysis, (Link, 1995; McColl et al., 2012), are intrinsically more difficult to study, due to the small size of the amyloid-β peptide. Indeed, the inclusions in amyloid-β animals appear less uniform when compared to the ones that can be observed in other model systems, such as the one of PolyQ worms, which are bright and well defined and are diffused into the body animals where the fluorescence signal overlaps. These limitations make the system much more challenging to be quantified and studied by means of conventional methods.

The present disclosure aims to at least partially address some of the limitations discussed above.

According to a first aspect of the disclosure there is provided Method of tracking a plurality of objects comprising: focusing an image of the objects on an imaging element using an optical system; capturing the image of the objects using an imaging element comprising a plurality of pixels; measuring at least one characteristic of the objects from the captured image using an image processor; wherein the field of view is set be the widest field of view for which the image processor is able to measure the at least one characteristic.

Optionally, the at least one characteristic includes on or more of: bends per minute, bending amplitude, length, translational speed and paralysis rate.

Optionally, the field of view is determined based on the average size of the objects and a predefined resolution required for the image processor to measure the at least one characteristic.

Optionally, the characteristic is length and/or translational speed and the predefined resolution is the resolution at which the objects are still detectable by the image processor.

Optionally, the characteristic is bending amplitude and/or bends per minute and the bending is calculated based on an eccentricity of the objects, and the predefined resolution is the resolution at which the total error in the characteristic is at a minimum. Optionally, the error minimum is determined based on the error on eccentricity caused by pixelisation of the object by the image processor.

Optionally, the predefined resolution corresponds to a smallest dimension of the object having a length between 0.5 pixels and 1.5 pixels. Optionally, the predefined resolution corresponds to a smallest dimension of the object having a length of 1 pixel.

Optionally, the objects are nematode worms. Optionally, the objects are *Caenorhabditis elegans*.

According to a second aspect of the disclosure, there is provided a method of preparing a sample of nematode worms, the method comprising: spraying a liquid comprising a pharmaceutical agent, onto a plate comprising the nematode worms.

Optionally, the method is part of a method of tracking nematode worms, wherein the method of tracking nematode worms is optionally the method according to the first aspect.

Optionally, the liquid is sprayed using an aerosol nebuliser.

Optionally, the nebuliser provides a conical spray having a predefined opening angle and the nebuliser is positioned a predefined distance from the agar plate such that at least 85% of the plate is covered by the spray.

Optionally, the method further comprises: drying the liquid sprayed onto the agar plate. Optionally, the drying step comprises placing the sprayed agar plate into a relatively low humidity environment. Optionally, the low humidity environment is provided by an ambient gas having a relatively high nitrogen content.

According to a third aspect of the invention, there is provided a method for identifying protein aggregate inclusions in a biological sample, the method comprising: capturing a fluorescence image of the biological sample; applying a threshold cut-off to the gradient magnitude of the captured image to generate a threshold image; and identifying protein aggregate inclusions based on the threshold image. Optionally, the threshold cut off is computed using a Scharr kernel.

Optionally, the method further comprises: determining one or more characteristics of the protein aggregate inclusions including: the number of inclusions, the size of inclusions and the fluorescence intensity of inclusions.

Optionally, the method is part of a method of tracking nematode worms, wherein the method of tracking nematode worms is optionally the method according to the first aspect.

Optionally, the biological sample is a sample of nematode worms prepared using to the method according to the second aspect.

According to a fourth aspect of the invention, there is provided a method of measuring anti-aggregation drug efficacy in a sample of nematode worms, comprising: measuring a plurality of characteristics of the sample of nematode worms; calculating a single anti-aggregation score based on each of the plurality of measurements.

Optionally, the anti-aggregation score is calculated based on a weighted average of the measurements. Optionally, the measurements are normalised based on corresponding measurements of a control sample of nematode worms.

Optionally, the measured characteristics include at least two of: average bends per minute of the nematode worms, the average transitional speed of the nematode worms, the average paralysis rate of the nematode worms, the average number of protein aggregate inclusions per worm, the average size of protein aggregate inclusions and the average fluorescence intensity of protein aggregate inclusions, and the amount of a metabolite in the sample, wherein the metabolite is optionally hydrogen peroxide.

Optionally, the method is part of a method of tracking nematode worms, wherein the method of tracking nematode worms is optionally the method according to the first aspect.

Optionally, the biological sample is a sample of nematode worms prepared using to the method according to the second aspect.

Further features will be described below by way of non-limiting examples with reference to the accompanying drawings, briefly described below.

FIG. 1: Details of tracker geometry: worm movements are traced on up to 20 cm agar plates using an imaging system.

FIG. 2: Error on the eccentricity for a straight worm caused by resolution. The worm is assumed to be 15 times longer than wide.

FIG. 3: Evolution of the error with varying resolution. The aspect ratio of the worms is approximately 1:15.

FIGS. 4(*a*)-4(*f*): Images of two worms for increasing resolution, using worm lengths of 2.7 px (FIG. 4(*a*)), 3.7 px (FIG. 4(*b*)), 5.3 px (FIG. 4(*c*)), 11.3 px (FIG. 4(*d*)), 22.3 px (FIG. 4(*e*)), and 33.3 px (FIG. 4(*f*)). Below a worm length of 3 px, the worms are not distinguishable. Below 11 px, the dirt of the top of the left worm cannot be separated from the worm.

FIG. 5: Drug deposition method. The nebuliser is placed 74 mm above the plate and the 200 μl solution is sprayed over the surface of the plate covering 90% of the surface.

FIG. 6: Automated imaging analysis to define key features of protein aggregation in vivo. a) Comparison of macroscopic features of different worm models of AD and HT and relative controls. b) Application of the analysis platform to evaluate aggregation levels in worms which express aβ in the big muscle cells. c) Outputs of the code include number of inclusions, fluorescence intensity and size.

FIG. 7: An overview of the measurements on which the anti-aggregation score is based.

INFORMATION OPTIMISATION

A method of tracking a plurality of objects is disclosed, the method comprising projecting an image of the objects on an imaging element using an optical system and capturing the image of the objects using an imaging element comprising a plurality of pixels. The optical system may be any suitable arrangement of lenses, either refractive or reflective.

The imaging element may be any suitable imaging element, e.g. a CCD configured to capture monochrome or colour image data.

Using state of art off the shelf components like LED light sources, high resolution lenses and USB 3.0 cameras, large areas up to 20 cm were imaged with high enough resolution to observe the worm behaviours in a high throughput manner (FIG. 1 shows an example schematic set-up). In one example, a setup was composed of a GS3-U3-91S6M-C" Grasshopper USB 3.0 monocrome camera (Point Grey, Richmond, Calif., 14 bits, 9.1 Mpx) combined with a 16 mm focal length high resolution lens f/1.8-f/16 to image a 20 cm plate similar device under bright field illumination (8"×8" white AI side-fired backlight) (Edmund Optics Ltd.).

Cameras are limited in bandwidth. Accordingly, there is tradeoff between frame rate and image size. The limit on frames rate is given by the Nyquist-Shannon sampling theorem. For example, to detect worms with 3 bends per second, at least 6 frames per second (FPS) is required. In one example, a 9 FPS camera that can take 9.1 megapixels images is used. In that way we optimize the available number of pixels for gathering information on the objects.

By using this combination of above mentioned components data acquisition was achieved over surfaces as large as 20 cm in diameter. Data for moving worms were acquired continuously at a time resolution of 7-25 frames per second (fps). The imaging area is above 400 $cm^2$ with a lateral resolution down to 67 μm, allowing the imaging of 20 cm petri dishes. The field of view can be reduced to observed smaller petri dishes at higher lateral resolution.

The method according to the disclosure further comprises measuring at least one characteristic of the objects from the captured image using an image processor. The image processor may comprise a standard multi-purpose processor and a memory having stored thereon a computer program that when executed by the processor carries out the image processing on the captured image data. Alternatively, the image processor may comprise a processor having an architecture configured specifically to carry out the image processing on the captured image data.

In an example method, tracking was performed on custom assembled computer with an IntelCore™ i7-6950×3.00 GHz processor and 64 GB of RAM. A custom software with GUI is used to select parameter for image processing and display/save the results.

An example image processing method is described below in the context of tracking nematode worms. However, it should be understood that the method according to the disclosure is limited to identifying and tracking nematode worms. For example, the method is suitable for use with any object exhibiting similar behaviours, such as translational movement, and/or bending.

In the example, the image processing comprises the following steps:

1) Removing the background signal
   A Gaussian filter is applied on the image to detect the background signal. All pixels higher than this background signal plus a threshold are marked and excluded from a second application of the Gaussian filer, which allows a better detection of the background signal.
2) Detecting the worms
   A second threshold is applied on the flattened image to separate foreground from background. Morphological operations such as opening and closing are used to close holes and exclude speckles. The remaining connected regions are then labelled. The size of the regions is used to detect false-positive regions. Options to tweak this algorithm are available through the GUI.
3) Tracking the worms across frames
   A standard tracking algorithm (Allan et al., 2014) is used to follow worms between frames, taking into account "disappearances" and overlap.
4) Parameter extraction
   Each region is reduced to a morphological skeleton and optionally pruned to remove unwanted appendices. The skeleton gives information about the position, length, and bending of the worm. The bending can e.g. be extracted from the eccentricity of the region defined by the skeleton.
   These steps allow to track the movement and agitation of worms over time. Many population-wide or animal-specific parameters can be used. (e.g. bending rate, speed, paralysis rate, and length). The program can exclude paralysed and dead worms from the analysis. Many options are presents to visualise and save the data.

According to the method of the disclosure, the field of view of the optical system is set to be the widest field of view for which the image processor is able to measure a selected characteristic of the objects. This maximises the information that can be extracted from the predefined bandwidth of the imaging element. This is explained further below.

The minimum feature size of the object (e.g. nematode worm) that can be distinguished by the imaging system in microns is predefined. It can be assumed that two pixels are needed to detect the minimum sized feature. The imaging elements may have different length scale in different dimensions. Accordingly, the resolutions requirements will differ in different directions.

The error on a measure can either be random or systematic. By the central limit theorem, averages of samples with a random error will converge to a Gaussian distribution. The total error squared of the measure is therefore:

$$\sigma_{Tot}^2 = \frac{\sigma_{rand}^2 + \sigma_{pop}^2}{N_{Worms}} + \sigma_{sys}^2 \quad \text{(Eq. 1)}$$

Explained below is the case of measuring a parameter such as position, motion, length, or bending for many objects. If the resolution for a single object is smaller, the random and systematic errors are expected to increase. However, the field of view will be larger so the number of objects in the image will increase. We therefore expect to find a minima of the error. Here we will estimate the systematic ($\sigma_{sys}$) and random ($\sigma_{rand}$) errors, as well as the number of objects ($N_w$), as a function of the object length in pixels. All the objects do not behave in exactly the same way, but for a sufficiently large population, the distribution is expected to be normal, by the central limit theorem. $\sigma_{pop}$ is the standard deviation of this normal distribution.

For a constant number of pixels ($N_{px}$), the number of objects ($N_w$) on an image depends on the mean area per object ($A_{pw;mm}^2$). With the size of a pixel being based on the length of the object in mm ($L_{w,mm}$) and the length of the object in pixels ($L_{w,px}$) as follows:

$$S_{ps,mm} = \frac{L_{w,mm}}{L_{w,px}} \quad \text{(Eq. 2)}$$

The number of objects on an image is therefore related to the length of an object in pixels by:

$$N_w = \frac{N_{px,}}{A_{pw,mm2}} \frac{L_{w,mm}^2}{L_{w,px}^2} \quad \text{(Eq. 3)}$$

The error introduced by a decrease in resolution is proportional to the size of a pixel. This is straightforward for parameters such as position or length of the object. The bending of the object is estimated from the eccentricity of the object, taken from a thresholded image. The eccentricity (E) is defined from the large (B) and small (A) axis of an ellipse that has the same second-moments as the object:

$$E = \sqrt{1 - \frac{A^2}{B^2}} \quad \text{(Eq. 4)}$$

If A and B have an error $\sigma_{px}$, the error on the eccentricity is:

$$\sigma_E^2 = \frac{1}{E^2}(2 - E^2)(1 - E^2)^2 \frac{\sigma_{px}^2}{A^2} \quad \text{(Eq. 5)}$$

Therefore for a given eccentricity, the error is still proportional to $\sigma_{px}$. Taking only the random error into account, the relationship is:

$$\sigma_{Tot}^2 = \left(\frac{C^2}{L_{m,px}^2} + \sigma_{pop}^2\right) \frac{A_{pw,mm2}}{L_{w,mm}^2 N_{px}} L_{w,px}^2 \quad \text{(Eq. 6)}$$

-continued $$\sigma_{Tot}^2 = (C^2 + \sigma_{pop}^2 L_{w,px}^2) \frac{A_{pw,mm^2}}{L_{w,mm}^2 N_{px}}$$

This defines a parabola for the length of the object in pixels, $L_{w,px}$. This suggests that as long as you can detect an object and measure something, increasing the number of worms (i.e. reducing the length of the object in pixels) is always preferable to increasing the resolution.

However, this is only the case if the low resolution does not introduce a systematic error. For position, this is the case as the error can be in any direction. Accordingly, for measuring characteristics such as translational speed, the best resolution is therefore the minimum resolution at which the objects are still visible. Accordingly, the disclosure provides a method wherein the field of view may be set be the widest field of view for which the image processor is able to measure translational speed. As explained above, this is determined based on the average size of the objects and a predefined resolution required for the image processor to measure translational speed. For example, the predefined resolution corresponds to a smallest dimension of the object having a length between 0.5 pixels and 1.5 pixels.

In the case of bending of the object, the specific parameter of interest is the eccentricity of the ellipse that has the same second-moments as the image region covered by the object. Nematode worms for example, have an aspect ratio of about 1:15. Therefore, for a straight worm, the eccentricity is 0.998, as the length is 15 times the width. If the worm is represented by 3 pixels, the eccentricity drops to 0.943. The error is not random.

Figure 1:
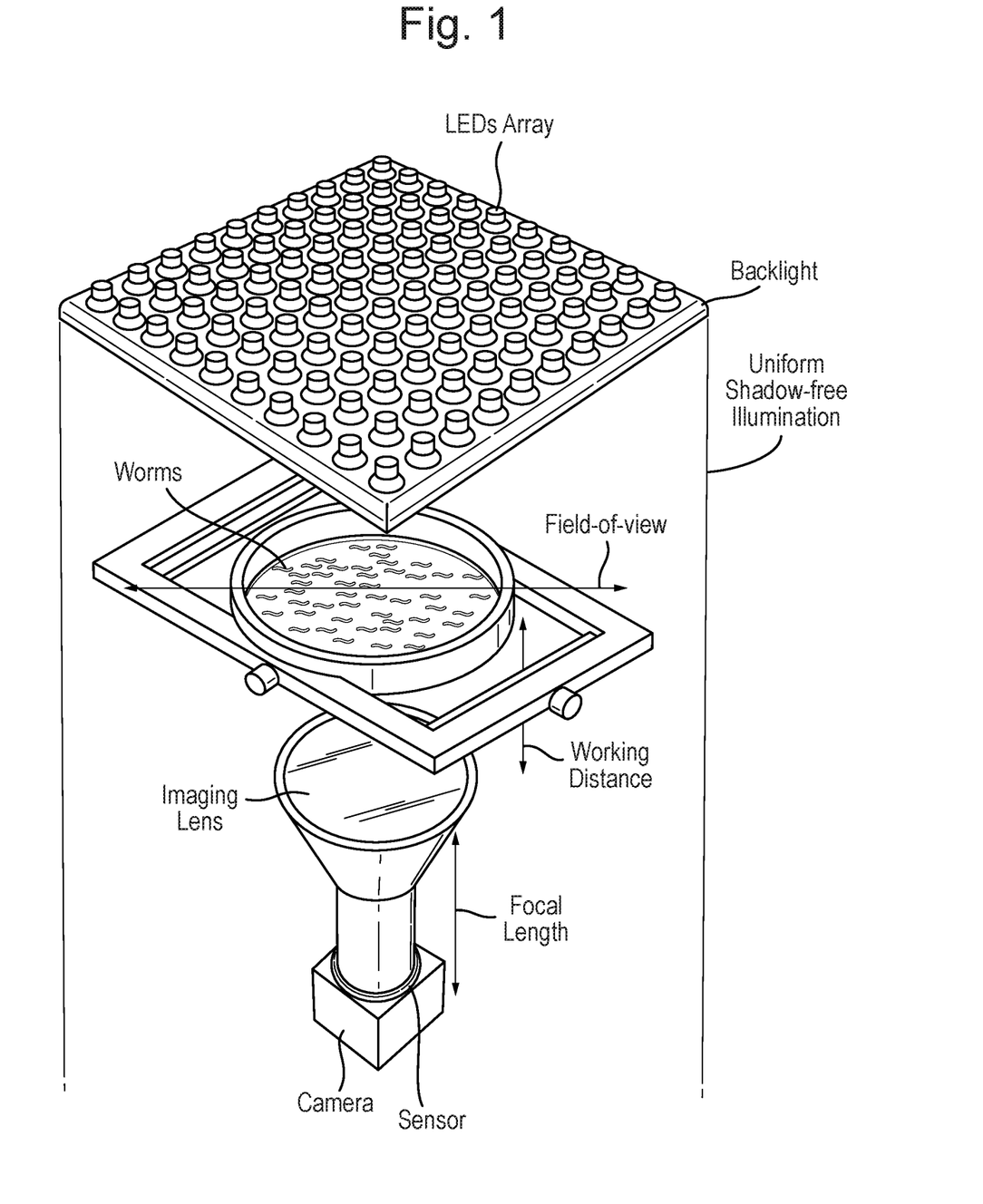
Figure 2:
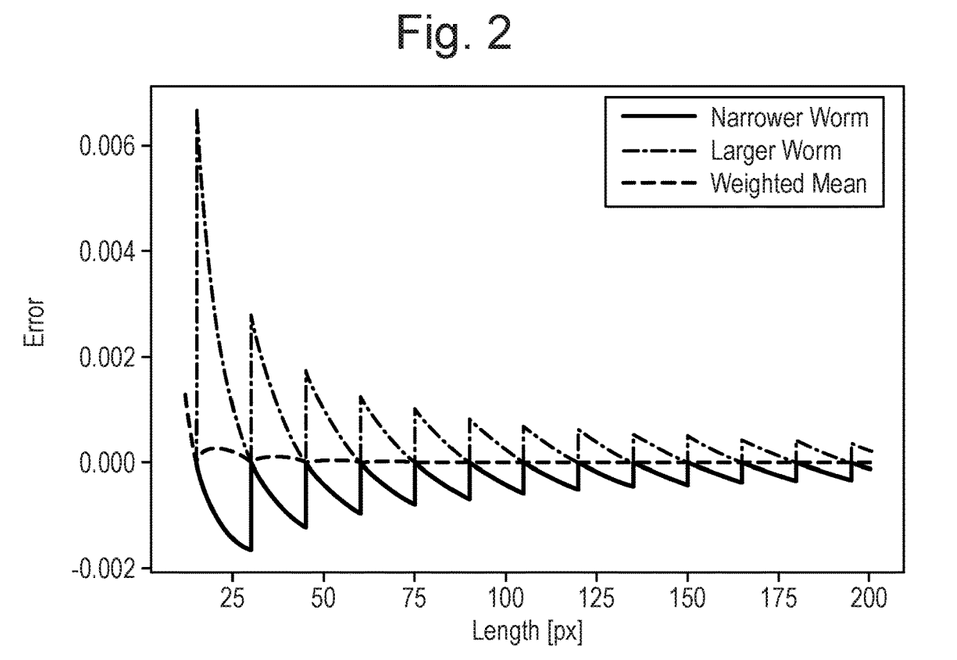

For a worm of 22.5 px, the real width is 1.5 and would therefore randomly be detected as 1 or 2 pixels. The error from taking the mean over a population is shown on FIG. 2. Adding this systematic error to equation 4, the error as a function of worm pixel length is given in FIG. 3.

Figure 3:
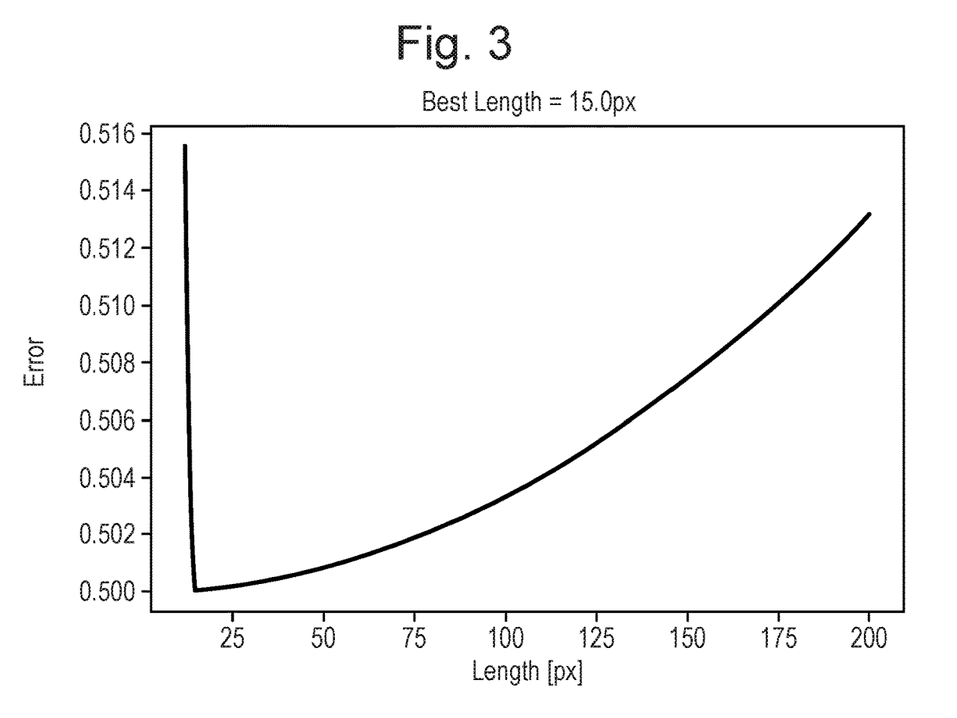
Figure 4A:
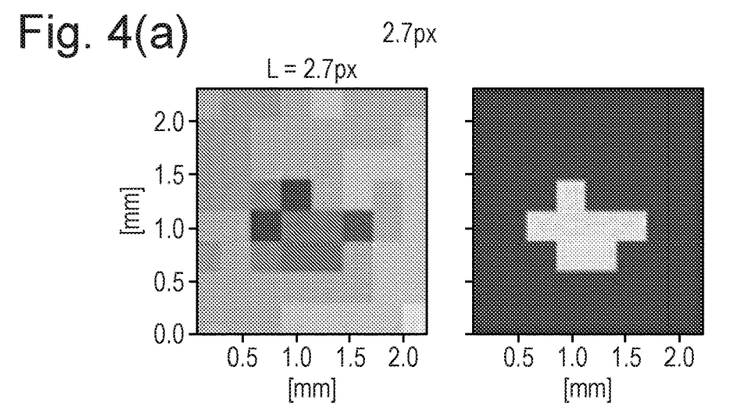
Figure 4B:
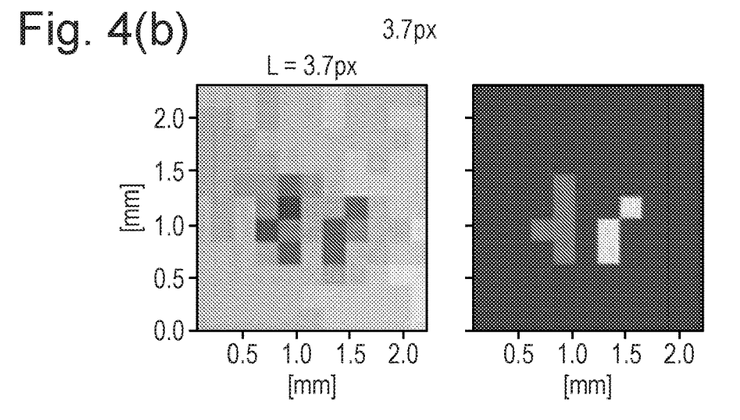
Figure 4C:
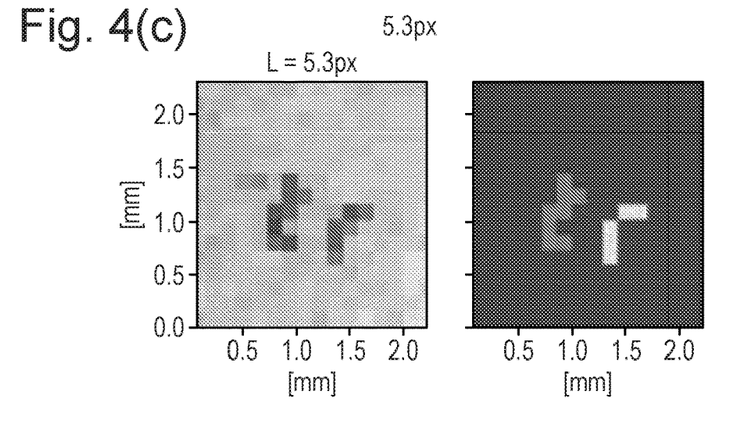
Figure 4D:
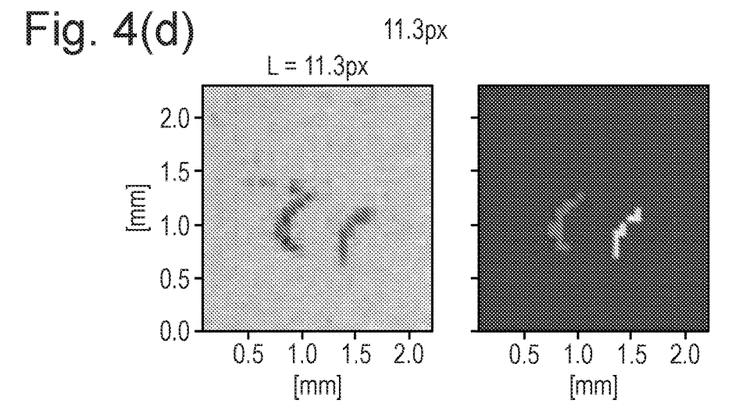
Figure 4E:
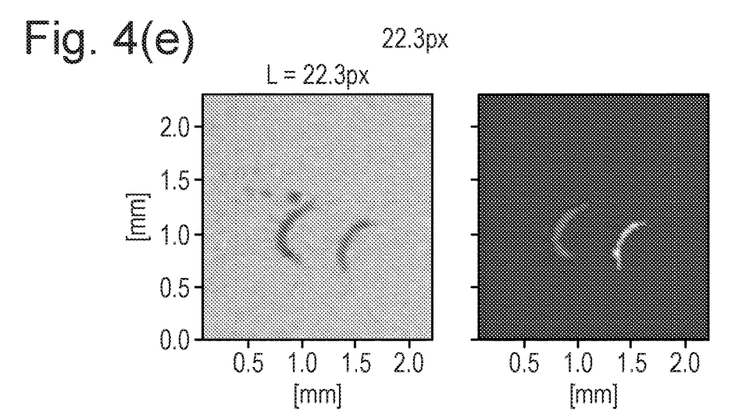
Figure 4F:
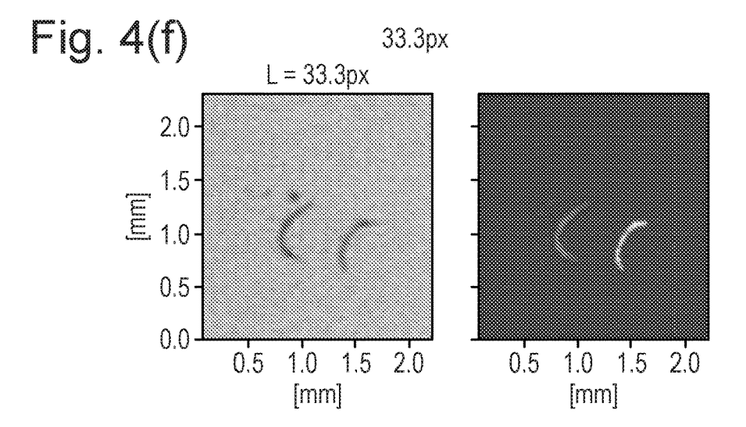

Accordingly the predefined resolution is the resolution at which the total error is at a minimum (see FIG. 3). The error minimum is determined from the error (i.e. systematic error) on eccentricity introduced by pixelisation of the object by the image processor. The best length is found to be 15 px, which corresponds to a width of 1 px.

FIG. 4 shows images of two worms for increasing resolution. Below a worm length of 3 px, the worms are not distinguishable.

Accordingly, for measuring characteristics such as bends per minute, the best resolution is resolution corresponds to a smallest dimension of the object having a length of 1 pixel. Using the 9.1 Mpx example imaging element described above, in combination with a 16 mm focal length lens, this equated to a field of view having a width of 20 cm.

The method disclosed allows data acquisition on a full 20 cm Petri dish or similar size sample holder while still maintaining a resolution appropriate for the simultaneous tracking of multiple nematodes and for defining multiple phenotypes for each animal. This approach has the advantage of offering much higher rates of throughput, while at the same time facilitating the screening of dilute suspensions of worms over a larger surface area, reducing significantly the chance of overlap and collisions.

Time taken to image the worms is typically a limiting factor for throughput. However, in an example, the method disclosed provides allows imaging of an order of magnitude more worms. Accordingly, data for around 1000-5000 worms can be obtained in a single screening which takes approximately 2 minutes. In the example, a single operator can simultaneously obtain images of 4 different samples, therefore up to around 20,000 worms. Images of around 100 samples can be obtained in around 3.5 h. This is a throughput similar to an in vitro testing platform.

The time period for image processing depends on the processing power used. However, this can run automatically, e.g. overnight, and typically takes 1 h to analyze around 20 videos. Therefore, image processing time is not considered a limiting factor for throughput.

Worm Preparation

Typically, a drug is put onto the plates using a pipette. Although, relatively slow, this method is perfectly adequate for use in combination with tracking methods presently used. This is because the drug delivery is not a limiting factor for the overall process.

A method of preparing a sample of nematode worms is disclosed, the method comprising spraying a liquid comprising a pharmaceutical agent (drug) onto a plate comprising the nematode worms.

Figure 5:
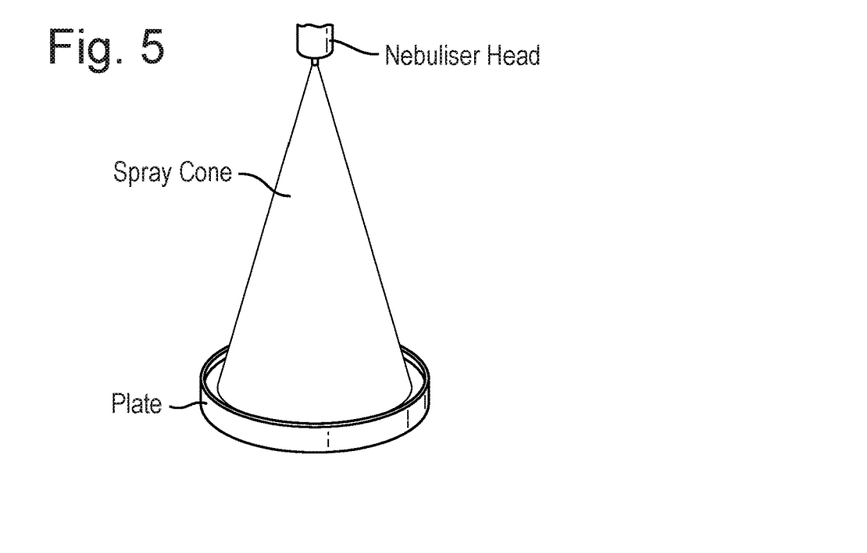

In one example, to improve the agar plate coating reproducibility and throughput, an aerosol nebuliser (shown in the FIG. 5). The nebuliser creates a uniform spray cone having a predefined opening angle (e.g. $\alpha=30°$) and produces droplets of a predefined diameter (e.g. $2R=30\text{-}50$ µm). Preferably, most of the drug molecules are deposited on the plate and cover at least 85%, e.g. about 90% of the plate area (width w=85 mm). Accordingly, the nebuliser head may be placed a predefined distance from the plate surface. The distance is calculated by $$H = \frac{w}{2\tan\left(\frac{\alpha}{2}\right)} \approx 74 \text{ mm}.$$

The spray scatters the droplets uniformly over the whole plate area, therefore, the minimum estimated number of droplets needed to fully cover the surface is:

$$N_{min} \approx \frac{A_{plate}}{A_{drop}} = \frac{\pi(w/4)^2}{\pi R^2} = \frac{w^2}{4R^2} \quad \text{(Eq. 7)}$$

The minimum volume to be sprayed is:

$$V_{min} = N_{min} V_{drop} = \frac{w^2}{4R^2} * \frac{4}{3}\pi R^3 = \frac{\pi w^2 R}{3} = \frac{\pi w^2 d}{6} \quad \text{(Eq. 8)}$$

Taking into account the factors discussed above, in the example a minimum sample volume of $V_{min}=110\text{-}180$ µl is required. Accordingly 200 µl per plate may be used. Conventionally, a volume of up to 2 ml should be used. Accordingly, 10 time less volume is used.

The method may include a drying step. This may comprise placing the sprayed plate into a relatively (compared to normal ambient air) low humidity environment. The method of claim 13, wherein the low humidity environment is provided by an ambient gas having a relatively high (compared to normal ambient air) nitrogen content.

One of the key parameters in agar plate preparation is the liquid drying time. Drying under nitrogen gas improved the drying time by at least 3 times. The combined plate preparation throughput has been improved by an order of magnitude of around 15 times.

The method according to the disclosure improves experimental reproducibility as it disperses the drug solution across the plates much more uniformly. This also requires a much lower amount of drug quantities despite having the same sensitive effect on the animal's behaviour. Further, the method allows improvements in throughput due to faster drug delivery, particularly when used in combination with the tracking method disclosed herein.

Following the drug deposition on the agar plates, the worms are then placed on the placed and exposed to the drugs for the whole duration of the experiment. This preparation step increases notably the reproducibility of the experiment as well as the maximum throughput achievable.

Protein Aggregate Inclusions

An method for identifying protein aggregate inclusions in a biological sample is disclosed herein, the method comprising capturing a fluorescence image of the biological sample. This may be performed according to any known method such as those discussed above. For example, there may be a step of fusing the protein of interest with fluorescent dyes, such as the YFP.

In one example, individual animals were mounted on 2% agarose pads, containing 40 mM $NaN_3$ as an anaesthetic, on glass microscope slides for imaging. For quantification of the number of inclusions in amyloid-β animals, only the frontal region of the worms was considered. For quantifications of the number of inclusions in the PoliQ animals, the whole animals were considered. The number of inclusions in each animal was quantified using a Leica MZ16 FA fluorescence dissection stereomicroscope (Leica Microsystems, Wetzlar, Germany) at a nominal magnification of 10×, 20× or 40×, and images were acquired using an Evolve 512 Delta EMCCD Camera, with high quantum efficiency (Photometrics, Tucson, Ariz., USA).

The fluorescence image data was input to an image processor. The image processor may comprise a standard multi-purpose processor and a memory having stored thereon a computer program that when executed by the processor carries out the image processing on the captured image data. Alternatively, the image processor may comprise a processor having an architecture configured specifically to carry out the image processing on the captured image data.

Figure 6A:
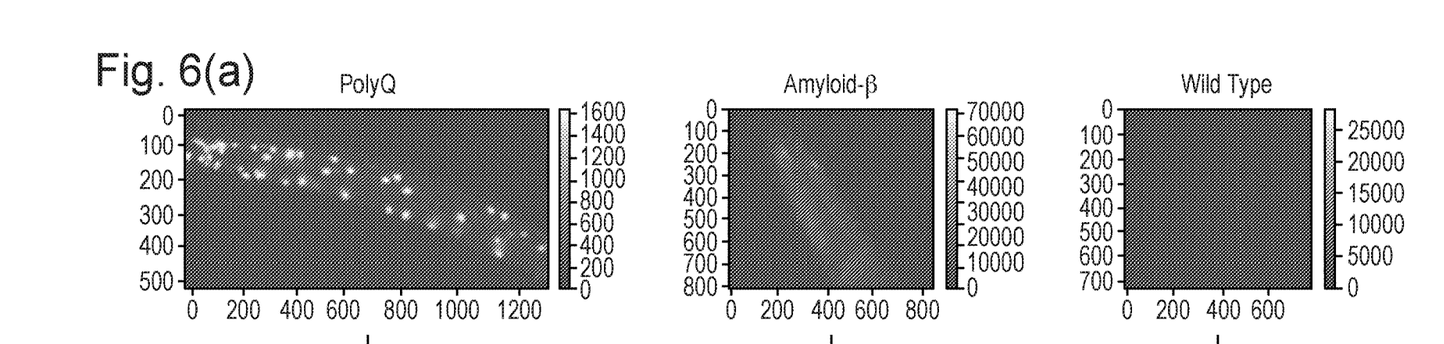
Figure 6B:
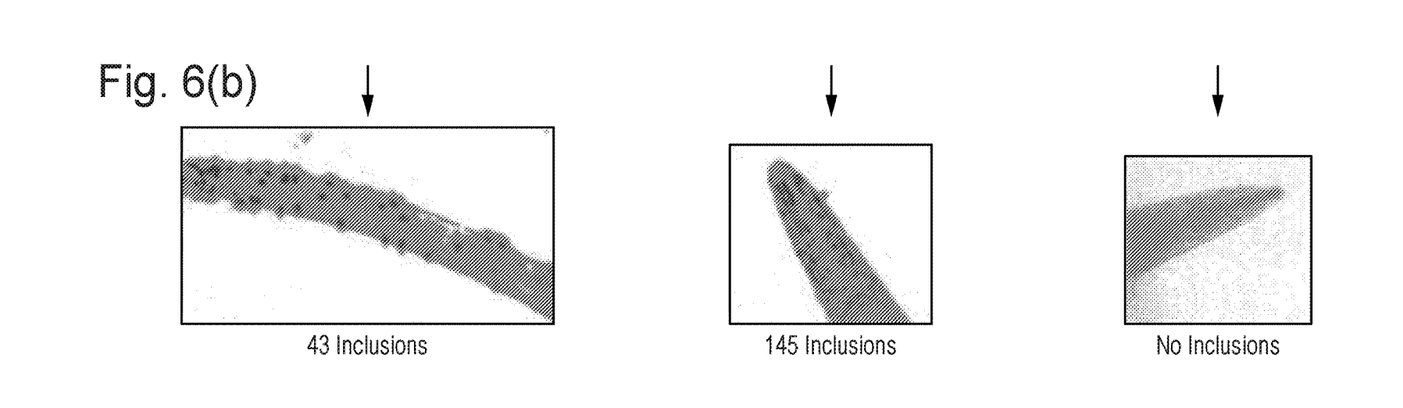
Figure 6C:
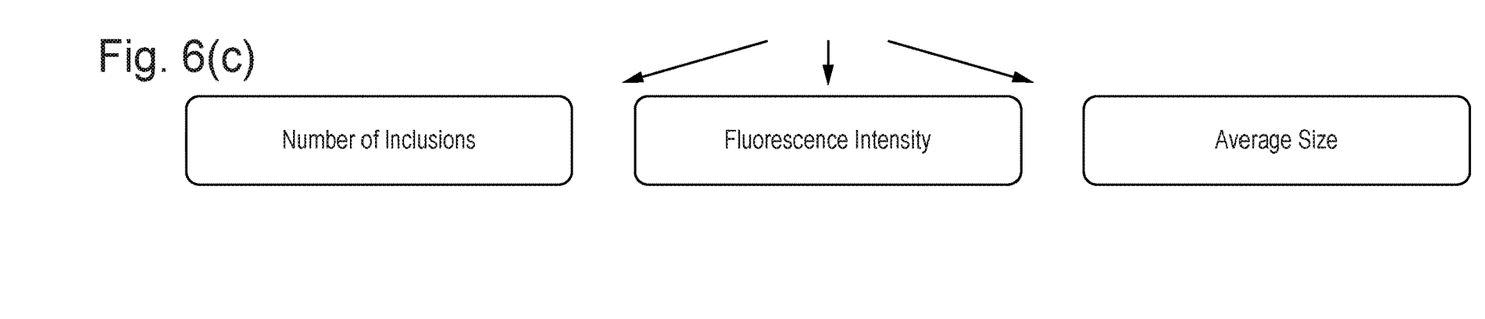

In order to obtain an accurate number of the inclusions, a commonly used method is to define a threshold of fluorescence intensity with respect to background. However, while this works reliably for high intensity inclusions, such as those observed in polyQ (FIG. 6), choosing a reliable threshold for a range of images can prove challenging as the inclusion intensity varies. Furthermore, for systems such as amyloid-β where a large, diffuse, and uneven fluorescence is present, this makes the determination of a suitable threshold even more challenging (FIG. 6).

To address this problem, the image processor applies a threshold cut-off to the gradient magnitude of the captured fluorescence image to generate a threshold image. The inclusions are typically a localized variation in intensity with a clear difference to the surroundings, which results in a high gradient magnitude. The threshold cut off may be computed using a Scharr kernel, for example.

Using this approach, the centre of large inclusion may not be fully captured by the thresholding, as the gradient in his area is low. Therefore a local maxima filter can be applied to the image data (prior to thresholding) in order to determine the intensity of the inclusions.

Based on the threshold image, the protein aggregate inclusions can be identified by the image processor. The image processor may determine one or more characteristics of the protein aggregates including: the number of inclusions per worm, the average size of inclusions and the average fluorescence intensity of inclusions.

According to the method disclosed herein, it is possible to measure and quantify key features of protein inclusions per animal such as their number, size and fluorescence intensity using well-established worms strains (although the method is not limited to nematode worms). The method is expected to have widespread applications not only in understanding protein aggregation but will be priceless for drug discovery against protein misfolding diseases. In particular, the combination of this imaging approach with the behavioural assays disclosed herein, provides another edge into understanding the specificity of drug effects.

Anti-Aggregation Score

A method of measuring anti-aggregation drug efficacy in a sample of nematode worms is disclosed herein, the method comprising measuring a plurality of characteristics of the sample of nematode worms and calculating a single anti-aggregation score based on each of the plurality of measurements.

The anti-aggregation sore may be calculated based on a weighted average of the measurements. The measurements may be normalised based on corresponding measurements of a control sample of nematode worms. The measured characteristics may include at least two of: average bends per minute of the nematode worms, the average transitional speed of the nematode worms, the average paralysis rate of the nematode worms, the average number of protein aggregate inclusions per worm, the average size of protein aggregate inclusions and the average fluorescence intensity of protein aggregate inclusions, the amount of a metabolite in the sample.

In one example, the so called anti-aggregation score (AA) for a given strain (e.g. wild-type or Alzheimer's strain) is as follows:

$$AA_{strain} = 100 * \left\langle \frac{\frac{BPM_+}{BPM_-} + \frac{Speed_+}{Speed_-} + \frac{NPR_+}{NPR_-}}{3} \right\rangle_{days} \quad \text{(Eq. 9)}$$

BPM, and NPR are respectively the averages of body-bends per minute and non-paralysed ratio, and together with the average speed. These may be measured using the tracking method disclosed herein. The angular brackets denote the average over the days after the administration of the drug for which screenings have been carried out for both treated worms (+) and worms subjected to identical conditions but not treated with the drugs (−), i.e. control worms. The number three at the denominator is the number of "dimensions", which corresponds to the different phenotypic readouts used in this calculation.

Figure 7:
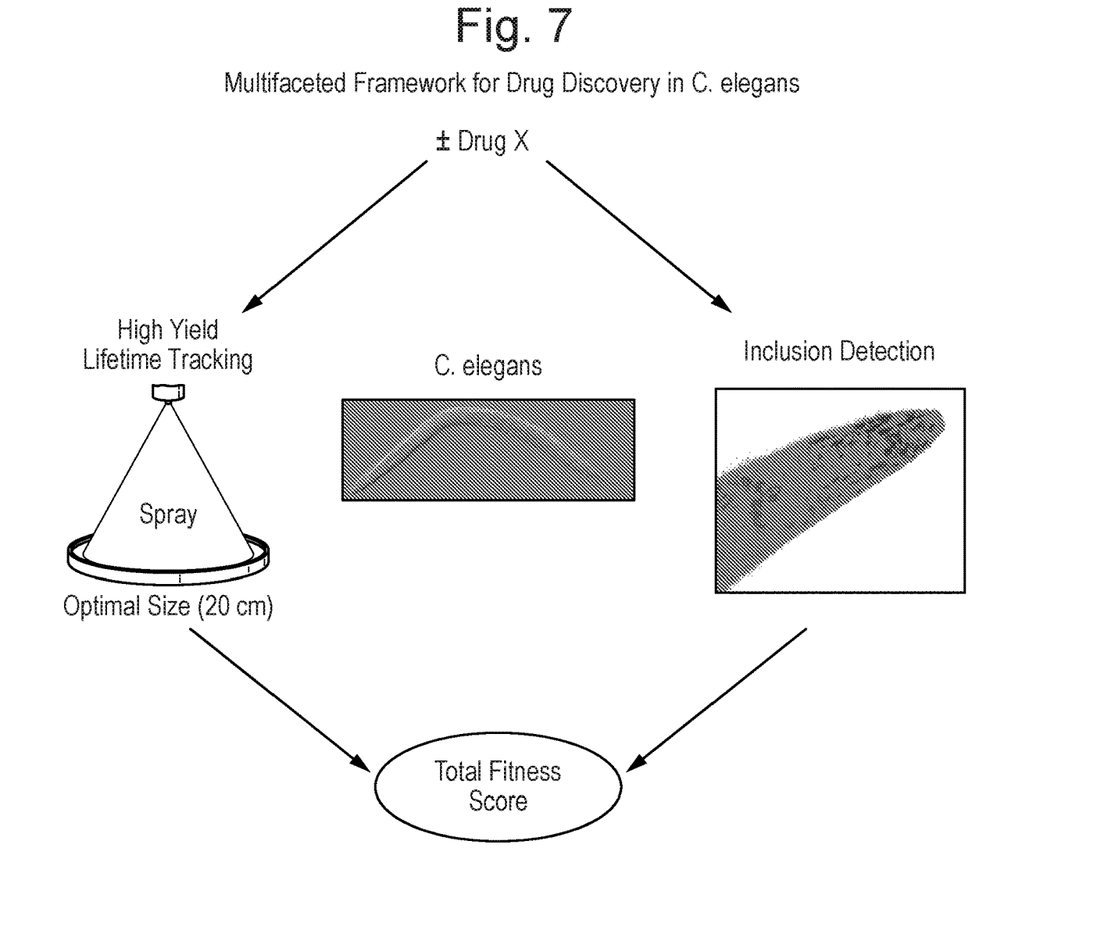

This definition of the AA score can readily be generalised to encompass more phenotypic readouts. These may include: the average number of protein aggregate inclusions per worm, the average size of protein aggregate inclusions and the average fluorescence intensity of protein aggregate inclusions, the amount of a metabolite in the sample. Such a method is summarized by FIG. 7.

Alternatively the AA score can be calculated by summing the dimensions obtained with a principal component analysis carried out on large screening datasets comprising different phenotypic readouts.

The measurements pertaining to protein aggregate inclusions may be calculated using the method for identifying protein aggregate inclusions disclosed herein.

For the characteristic of the amount of a metabolite in the sample, the metabolite may be a reactive oxygen species, such as hydrogen peroxide.

In one example, in order to carry our reactive oxygen species measurements a ROS-Glo™ $H_2O_2$ cell kit assay was used (Promega, Fitchburg, Wis., USA). The ROS-Glo™ $H_2O_2$ Assay is a bioluminescent assay that measures the level of hydrogen peroxide ($H_2O_2$), a reactive oxygen species, directly in cell culture or tissue or in defined enzyme reactions. A derivatized Luciferin substrate is incubated with the sample and reacts directly with $H_2O_2$ to generate a Luciferin precursor. 500 AD worms and control worms treated with the appropriate drugs and 1% DMSO, respectively, were collected at the day 3 of adulthood and incubated for 6 h with a ROS Substrate Solution (Promega, Fitchburg, Wis., USA), after which they incubated for 20 min with the detection solution and the luminescence was then measured with a luminescence GloMax® Explorer System (Promega, Fitchburg, Wis., USA).

Experimental Methods

Standard conditions were used for the propagation of *C. elegans* (Brenner, 1974). Briefly, the animals were synchronized by hypochlorite bleaching, hatched overnight in M9 buffer (3 g/l KH2PO4, 6 g/l Na2HPO4, 5 g/l NaCl, 1 µM MgSO4), and subsequently cultured at 20° C. on nematode growth medium (NGM) (CaCl2 1 mM, MgSO4 1 mM, cholesterol 5 µg/ml, 250 µM KH2PO4 pH 6, Agar 17 g/L, NaCl3 g/l, casein 7.5 g/l) plates seeded with the *E. coli* strain OP50. Saturated cultures of OP50 were grown by inoculating 50 mL of LB medium (tryptone 10 g/l, NaCl 10 g/l, yeast extract 5 g/l) with OP50 and incubating the culture for 16 h at 37° C. NGM plates were seeded with bacteria by adding 350 µl of saturated OP50 to each plate and leaving the plates at 20° C. for 2-3 days. On day 3 after synchronization, the animals were placed on NGM plates containing 5-fluoro-2'deoxyuridine (FUDR) (75 µM, unless stated otherwise) to inhibit the growth of offspring.

For drug screening on solid media, 200 µl aliquots of drugs dissolved in 1% DMSO at different concentrations were sprayed onto the NGM plates. The plates were then placed in a sterile laminar flow hood at room temperature under nitrogen flow to dry. Worms were transferred onto the NGM or FUDR drug-seeded plates, directly at larval stage L1 and L4 respectively, or Day 3 in alternative sets of experiments and they were exposed to drug for the whole duration of the experiment.

The following strains were used to test the methods: dvIs100 [unc-54p::A-beta-1-42::unc-54 3'-UTR+mtl-2p::GFP] (GMC101), which produces constitutive expression of GFP in intestinal cells; unc-54p::A-beta-1-42 which expresses full-length human Aβ$_{42}$ peptide in bodywall muscle cells that aggregates in vivo; shifting L4 or young adult animals from 20° C. to 25° C. causes paralysis (McColl et al., 2012). dvIs15 [(pPD30.38) unc-54 (vector)+ (pCL26) mtl-2::GFP]. AM141 animals show a soluble Q40::YFP distribution in body wall muscle cells immediately after hatching. As these worms age the rapid formation of foci is observed. When they reach adulthood, AM141 animals show an entirely Q40::YFP aggregated phenotype (Morley et al., 2002). N2, wild-type *C. elegans* var Bristol, in this work referred to as control worms or wild-type worms. Generation time is about 3 days (Brenner, 1974).

All *C. elegans* populations were cultured at 20° C. and developmentally synchronized from a 4 h egg-lay. At 64-72 h post egg-lay (time zero) individuals were transferred to FUDR plates, and the temperature was raised to 25° C. when aβ aggregation was required. Body movements were assessed over the times indicated. At different ages, the animals were washed off the plates with M9 buffer and spread over an OP-50 unseeded 20 cm plate, after which their movements were recorded at 7-25 fps using the software for 1 min. Up to 5000 animals were counted in each experiment unless stated otherwise, Videos were analysed using a custom made tracking code which measures different metrics, including body bends/min, swimming speed, and paralysis assays; we considered that worms showing less than 5 body bends/min and moving at less than 0.1 mm/min to be paralysed.

The invention claimed is:

1. A method of tracking a plurality of objects, wherein the objects are nematode worms, comprising:
   focusing an image of the objects on an imaging element using an optical system;
   capturing image frames of the objects using the imaging element comprising a plurality of pixels;
   measuring at least one characteristic of the objects from the captured image using an image processor;
   wherein a field of view of the optical system is set to be the widest field of view for which the image processor is able to measure the at least one characteristic, and the field of view is determined based on the average size of the objects and a predefined minimum resolution required for the image processor to measure the at least one characteristic; and
   wherein the at least one characteristic comprises one or more of: bends per minute, bending amplitude, length, translational speed and paralysis rate.

2. The method of claim 1, wherein the at least one characteristic comprises bends per minute.

3. The method of claim 1, wherein the at least one characteristic comprises length and/or translational speed and the predefined resolution is the resolution at which the objects are still detectable by the image processor.

4. The method of claim 1, wherein the at least one characteristic comprises bending amplitude and/or bends per minute and the bending is calculated based on an eccentricity of the objects, and the predefined resolution is the resolution at which the total error in the characteristic is at a minimum.

5. The method of claim 4, wherein the error minimum is determined based on the error on eccentricity caused by pixelisation of the object by the image processor.

6. The method of claim 1, wherein the predefined resolution corresponds to a smallest dimension of the object having a length between 0.5 pixels and 1.5 pixels.

7. The method of claim 1, wherein the predefined resolution corresponds to a smallest dimension of the object having a length of 1 pixel.

8. The method of claim 1 wherein the objects are *Caenorhabditis elegans*.

9. The method of claim 1 further comprising preparing a sample of nematode worms:
   by spraying a liquid comprising a pharmaceutical agent onto a plate comprising the nematode worms.

10. The method of claim 9, wherein the liquid is sprayed using an aerosol nebuliser.

11. The method of claim 1, wherein the at least one characteristic comprises bending amplitude.

12. The method of claim 1, wherein the at least one characteristic comprises length.

13. The method of claim 1, wherein the at least one characteristic comprises translational speed.

14. The method of claim 1, wherein the at least one characteristic comprises paralysis rate.

15. The method of claim 1, wherein measuring at least one characteristic comprises:
   removing a background signal from captured images;
   detecting the objects; and
   tracking the objects across frames.

16. The method of claim 1, wherein the imaging element has a resolution of about 9.1 Mpx, the optical system has a focal length of about 16 mm, and the field of view has a width of about 20 cm.

17. The method of claim 1, wherein the nematode worms are provided on a 20 cm Petri dish or similar size sample holder.

18. The method of claim 1, wherein data for around 1000-5000 nematode worms is obtained in a single screening.

* * * * *